Figure 1:
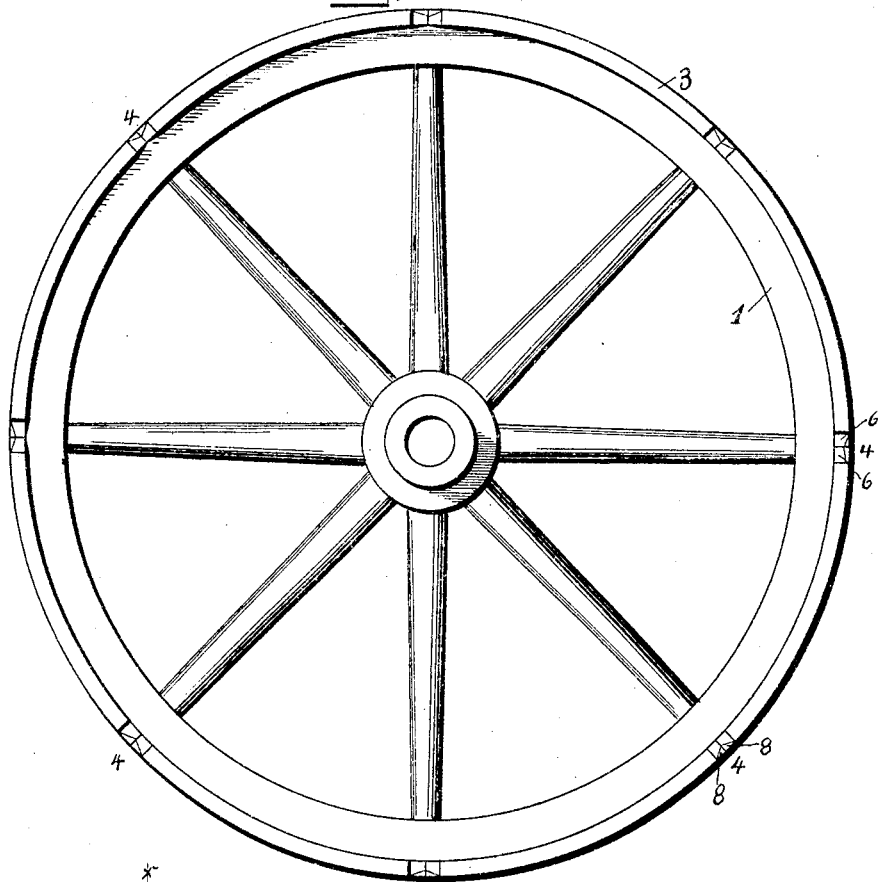

No. 805,837.　　　　　　　　　　　　　　　　　PATENTED NOV. 28, 1905.
R. A. BOYER.
WHEEL.
APPLICATION FILED JAN. 13, 1905.

Witnesses:
C. Klostermann
K. H. Butlin

Inventor.
R. A. Boyer.
by H. C. Evert & Co.
Attorneys.

UNITED STATES PATENT OFFICE.

RICHARD A. BOYER, OF SHARPSBURG, PENNSYLVANIA.

WHEEL.

No. 805,837.  Specification of Letters Patent.  Patented Nov. 28, 1905.

Application filed January 13, 1905. Serial No. 240,915.

*To all whom it may concern:*

Be it known that I, RICHARD A. BOYER, a citizen of the United States of America, residing at Sharpsburg, in the county of Allegheny and State of Pennsylvania, have invented certain new and useful Improvements in Wheels, of which the following is a specification, reference being had therein to the accompanying drawings.

This invention relates to certain new and useful improvements in wheels, and more particularly to the tires thereof.

The object of this invention is to provide a novel form of tire which will assist vehicles in overcoming obstacles.

Another object of this invention is to provide a novel form of tire which is adapted to assist vehicles in surmounting the outer flange of street-car tracks when turning out of the track.

Briefly described, my improvement resides in providing the one edge of a tire with a plurality of notches, each notch having beveled faces, which are constructed at such angles as to assist the wheel carrying the tire to climb or mount obstacles that may lie in its path of travel.

It is a well-known fact that a great many vehicles are constructed with a gage equal to the gage of street-car tracks, whereby the vehicles can travel upon said tracks and acquire a greater speed and easier riding. At times it is necessary for vehicles to turn out of the track to allow street-cars to pass, and for this reason I have provided my improved wheel-tire which will assist the wheels of a vehicle in climbing the outer flange of a street-car track.

The above construction will be hereinafter more fully described and then specifically pointed out in the claims, and, referring to the drawings accompanying this application, like numerals of reference designate corresponding parts throughout the several views, in which—

Figure 2:
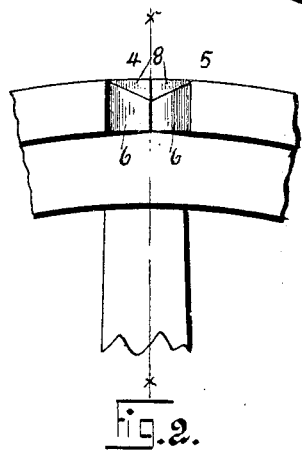
Figure 3:
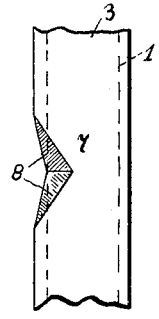
Figure 4:
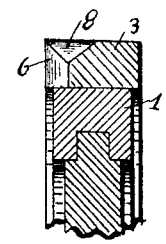

Figure 1 is a side elevation of a wheel provided with a tire formed in accordance with my invention. Fig. 2 is an enlarged detail elevation view of a portion of the wheel, illustrating one of the notches formed in the tire thereof. Fig. 3 is a top plan view of the same, and Fig. 4 is a vertical sectional view taken on the line $x\,x$ of Fig. 2.

In the accompanying drawings, the reference-numeral 1 designates the ordinary type of wheel, which carries a tire 3, and my invention resides in providing this tire with a plurality of notches 4. In order that the tire may be supported where the notches are formed, I preferably provide the notches in the tire directly opposite the spokes thereof, as clearly illustrated in Fig. 1 of the drawings. Each notch is identical in construction. Therefore I only deem it necessary to describe one of said notches. The edge of the tire, as indicated by the reference-numeral 5, is cut away, forming two beveled faces or surfaces 6, and the top of the tire 7 or the bearing-surface thereof is cut away adjacent to the beveled faces 6 6, forming beveled surfaces 8 8, which incline toward the beveled faces 6 6.

The notches 4 are formed upon the outer edge of the tires of a vehicle, and we will assume that the vehicle is traveling upon a street-car track and it is desired to turn out of the same. When the driver of the vehicle turns the horses or horse to one side, the tire of one of the vehicle-wheels will grind or bear against the outer flange of the street-car track until one of the notches 4 has engaged the same. As one of the notches 4 contacts with the outer flange of a street-car track one of the faces 8 8 will lie upon the top of the outer flange of the car-track, forming a flat surface which will upon a further movement of the vehicle elevate the wheel sufficiently to cause it to ride over the flange of the car-track. When the beveled face 8 engages the outer flange of the car-track, the wheel is assisted in riding over toward the same by one of the beveled faces 6, which readily permits of the wheel turning at an angle to the car-track without grinding upon the inner face of the flange of the track.

While I have shown the wheel in the accompanying drawings as being provided with notches directly opposite the spokes thereof, it is obvious that the wheels of certain vehicles, such as fire apparatus, may be provided with a plurality of notches arranged closer together, whereby a vehicle so constructed can quickly turn out of the street-car track.

I do not care to confine myself to the particular angle at which the beveled faces are inclined or constructed, and various other slight changes may be made in the general construction without departing from the general spirit and scope of the invention.

What I claim, and desire to secure by Letters Patent, is—

A wheel-tire, having notches formed in its one edge, each notch having two oppositely-inclined vertical faces in the edge of the tire and two beveled faces in the tread of the tire, the said beveled faces in the tread of the tire joining with the faces in the edge of the tire, substantially as described.

In testimony whereof I affix my signature in the presence of two witnesses.

RICHARD A. BOYER.

Witnesses:
 E. E. POTTER,
 K. H. BUTLER.